G. MEYER & J. DICK.
Apparatus for Pitching Casks, Barrels, &c.
No. 141,449.                        Patented August 5, 1873.
Fig. 1.
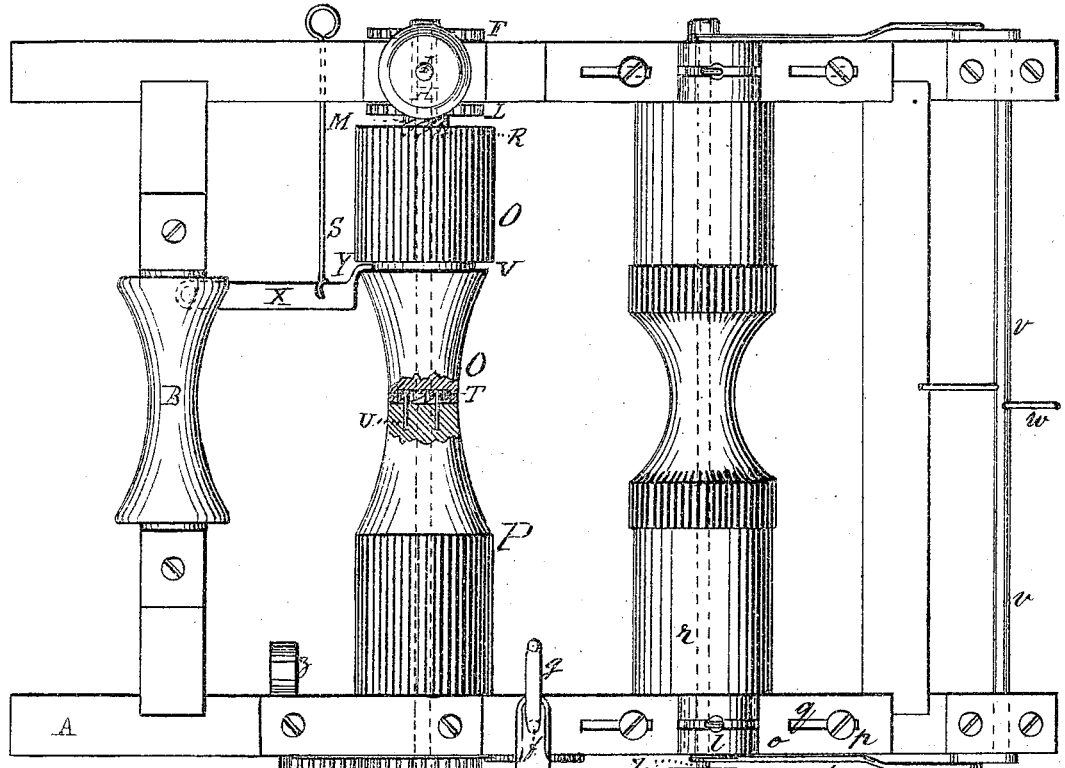
Fig. 2.
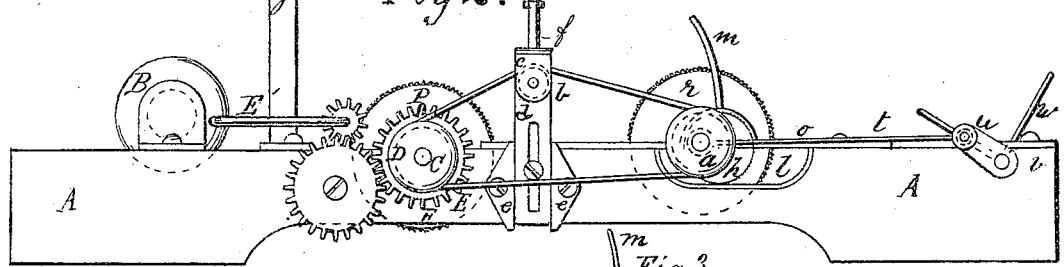
Fig. 3
Fig. 4
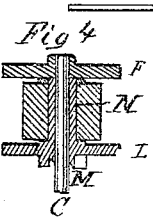
Witnesses:
Inventors
Gustavus Meyer
John Dick
by their attorneys

UNITED STATES PATENT OFFICE.

GUSTAVUS MEYER AND JOCHN DICK, OF QUINCY, ILLINOIS.

IMPROVEMENT IN APPARATUS FOR PITCHING CASKS, BARRELS, &c.

Specification forming part of Letters Patent No. 141,449, dated August 5, 1873; application filed June 19, 1873.

*To all whom it may concern:*

Be it known that we, GUSTAVUS MEYER and JOCHN DICK, of Quincy, Illinois, have invented certain new and useful Improvements in Machines for Pitching Barrels, of which the following is a specification, reference being had to the accompanying drawings.

The invention relates to a device for pitching the interior of kegs, barrels, casks, and other similar vessels, and consists: First, in providing a frame with two adjustable rollers of even superficies throughout, or concave at their centers, having corrugations over their entire surface, or adjacent their centers if concave, and operated by a band or other suitable appliance, and so arranged that when the cask is placed in a horizontal position upon the center of the rollers it will be rotated in the plane of its vertical axis. Second, in constructing one of the rollers in two sections, one of which is movable upon the axle of the roller, and provided at one end with a female clutch to receive the male clutch upon the other portion of the roller, so that both sections may be moved together. The movable portion is also provided at its opposite end with a female clutch, which engages the male clutch about the center of a gear-wheel mounted at one end of a tubular axle, fitting loosely about the roller-axle, and engaging a crown or bevel-gear wheel above, which is operated by a wheel at the end of the roller-axle, all arranged so that the movable part when in operation moves in a reverse direction to the other part of the axle, whereby the cask placed as aforesaid is rotated upon its vertical axis. Third, in providing the extremities of the solid roller with eccentric bearings, which are operated in elongated movable boxes, and so arranged that when the bearings are rotated the elevation of the rollers is effected. Fourth, in attaching to the ends of the axle of the solid roller draw-rods, which are operated by rotating a shaft at the end of the frame, thus increasing or reducing the distance between the rollers. Fifth, in providing a friction-roller secured in such position adjacent to the double roller as to preserve the cask in the proper position for operation.

Figure 1 is a plan view of a device embodying the elements of the invention. Fig. 2 is a side elevation of same. Fig. 3 is a similar view of the eccentric bearing $h$ and its appurtenances. Fig. 4 is a horizontal section through the centers of the wheels F L and adjacent parts.

A in the accompanying drawings is a horizontal frame, the center of one end of which is provided with the friction-roller B, concave on its surface, and having its vertical central plane coincident with the corresponding vertical central plane of the concavities of the several rollers. Opposite and properly distanced from the roller B, and journaled on proper bearings in the frame A, is provided the shaft C having at one extremity the band-wheel D, adjacent which is the spur-gear wheel E, which engages a spur-gear wheel operated by a pinion on the crank E'. The opposite end of the shaft C is provided with a spur-gear wheel, F, rigidly secured to the shaft C outside the frame, which wheel engages a crown spur-gear wheel, H, mounted upon the vertical axle I, and engaging on its opposite side the spur-gear L, on the inner central portions of which is provided the clutch M, opposite which is rigidly attached to the wheel L the tubular axle N, which projects through the frame A at its outer extremity, being provided with the rim to keep it in position, while it loosely incloses and forms the bearing or journal of the shaft C on this side of the frame, so that the shaft may be rotated without affecting the axle N. The double roller is composed of the two sections O and P, which are of like dimensions, cylindrical and corrugated at certain portions, and having a coincident concavity at their impinging extremities. The section O is mounted loosely upon the shaft C, having its end opposite the wheel L properly recessed to receive the wheel, and provided with a clutch, R, to engage the clutch M, when, by the operation of the lever S, it is thrown into position to rotate the cask upon its vertical axis. The opposite end of the section O is provided with a clutch, T, to receive the clutch U upon the other portion of the roller. The outer surface of the section O adjacent to the wheel L is properly milled or corrugated, an annular slot, V, being cut in the section O in which the tongue Y moves, which is moved laterally by the operation of the lever X, whereby the position of the section O upon the shaft is regulated. The section P is rigidly secured on its axis to the shaft C, and provided at its extremity opposite that adjacent the wheel F with the clutch U, which engages the clutch T when the cask is being rotated endwise. Parallel to and a proper distance from the shaft C is the shaft Z, provided opposite the band-wheel D with a band-wheel, $a$, the band connecting these wheels passing over a pulley-wheel, $b$, in the slot in the front portions of the horizontal bar $c$, the standard $d$ of which is slotted, depends and operates vertically between the guides $e$, the rear of the bar $c$ being sustained by the threaded lever $f$, which, being rotated by the crank $g$, the pulley-wheel $b$ is elevated or depressed, and the tension of the band thus respectively increased or diminished. The shaft Z at each side of the frame A passes similarly through the movable bearings $h$ in such manner that the axis of the shaft does not correspond with the axes of its bearings, which are milled on their outer curved surfaces to prevent movement as the shaft Z revolves, and are placed in the elongated slots $l$ cut in the frame A, and of such dimensions as that the bearings $h$ can be moved therein a suitable distance. The bearings are also provided with levers $m$ projecting upward through the guide-slots, or in the arches of the box $o$. The slots $l$ are covered by the arched boxes $o$, which are movable in a direction at right angles to the shaft Z upon guides $p$ in the slots $q$ at each end of the box $o$. The roller $r$ is mounted rigidly upon the shaft Z as an axis is provided with a concavity at its center, which coincides generally with the concavities of the sections O and P. The ends of the shaft Z are connected at a point outside the bearings $h$ by the draw-rods $t$ with the arms $u$ on the end of the shaft $v$ journaled at each side in the end of the frame A, and rotated by the radiating-levers $w$ secured at its center by the operation of which the distance between the shafts C and Z is regulated. The distance between the horizontal centers of the shafts C and Z should be equal to the radius of the end of the cask operated upon. By the operation of the levers $m$ the eccentric bearings are rotated and the elevation of the shaft Z affected, which shaft should be elevated or depressed according to the shape of the cask. In the present instance the device is provided with a fender, $z$, secured to the inner surface of the frame adjacent the crank E to keep the cask upon the sections O and P.

The pitch having been introduced into the cask it is placed in a horizontal position so that its vertical central plane coincides with the centers of the concavities in the roller $r$, and that formed by the central portions of the sections O and P, the clutch U being forced into the clutch T in the section O by operating the lever X toward the crank E, so that the sections O and P revolve together. The crank being operated the several rollers are rotated, the cask moves upon the rollers until the rear end of the cask passes the sections O and P, the lower edge of the cask passing down the concavity between them, the now lower end of the cask passing over the concavity until the edge which passed through the concavity, as aforesaid, comes in contact with the roller $r$, the corrugations adjacent the concavity in which, grasping the edge of the cask, give it an upward direction until it assumes a vertical position, when it rides over both rollers until that edge which was above, but now below, passes, as above described, through the concavity of the sections O and P, when the corrugations of the roller $r$, acting to throw the cask toward, and its center of gravity being deflected in, that direction, the cask falls gradually over upon the roller B, the descent of the cask being facilitated and guided by the concavity between the sections O and P. Thus the revolution of the cask on the plane of its vertical axis being accomplished by a continuation of the motion of the crank E the cask may be drawn from the roller B, and the above operation repeated until the pitch is properly distributed.

It is obvious that the above operation can be accomplished with the same facility if the sections O and P form one piece of material.

When it is desired to change the above movement the cask is rotated until it inclines over the roller P. The lever X is now drawn outward, disengaging the clutch U and throwing the clutch M in position against the clutch R, a reverse motion being intermediately communicated through the wheel F and crown spur-gear H; thence to the wheel L. The section O rotates upon the shaft C in a direction opposite that of the section P, so that the corrugations of these several parts acting upon the rim of the cask in different directions, it is revolved upon its axis, at the same time being sustained in position by resting upon the concavity in the roller $r$, the corrugations adjacent which, by partially elevating the proximate portions of the cask, give it a bearing upon the sections O and P, thus enabling them to revolve the cask.

It is obvious that a triple bevel-gearing can be substituted for the mechanism operating the section O. It is also obvious that the concavities in the several rollers and between the sections O and P are not essential to the rotation of the cask, but are mainly operative to preserve it in position.

What we claim as our invention, and desire to secure by Letters Patent, is—

1. The section O having clutches at each end mounted loosely upon a shaft and having an endwise movement, as and for the purposes shown and described.

2. The section O, in combination with the section P, substantially as shown and described.

3. The roller composed of the sections O and P, in combination with the roller $r$ for the purpose of rotating a cask or similar vessel in the plane of its vertical axis, substantially as shown and described.

4. The combination of the sections O and P, capable of reverse motion, and roller $r$ for the purpose of rotating a cask or similar vessel upon the axis of its cylinder, substantially as shown and described.

5. The combination of the sections O and P and roller $r$ operating horizontally, substantially as shown and described.

6. The combination of the sections O and P, rollers B and $r$, substantially as shown and described.

7. The milled eccentric-bearings $h$, substantially as shown and described.

8. The elongated slot $l$, in combination with the box $o$, substantially as shown and described.

9. The combination of the eccentric-bearings $h$, slot $l$, and box $o$, substantially as shown and described.

10. The shaft $v$, arms $u$, in combination with the draw-rods $t$ and shaft Z, substantially as shown and described.

11. The combination of the pulley-wheel $b$, bar $c$, lever $f$, slotted standard $d$, and movable shaft Z for the uses and purposes substantially as shown and described.

12. Two or more rollers, either concave or cylindrical, working in a horizontal position for rotating a cask, substantially as shown and described.

In testimony that we claim the foregoing improvements in machines for pitching barrels as above described, we have hereunto set our hands and seals this 16th day of May, 1873.

GUSTAVUS MEYER. [L. S.]
JOCHN DICK. [L. S.]

Witnesses:
ROBERT VOETH,
AUG. DORKENWALD.